(12) United States Patent
Fukushima

(10) Patent No.: US 8,305,017 B2
(45) Date of Patent: Nov. 6, 2012

(54) MOTOR CONTROL CIRCUIT, MOTOR SYSTEM, AND MOTOR CONTROL METHOD

(75) Inventor: Takashi Fukushima, Tokyo (JP)

(73) Assignee: Asahi Kasei EMD Corporation, Tokyo (JP)

( * ) Notice: Subject to any disclaimer, the term of this patent is extended or adjusted under 35 U.S.C. 154(b) by 485 days.

(21) Appl. No.: 12/601,755

(22) PCT Filed: Feb. 19, 2009

(86) PCT No.: PCT/JP2009/052876
§ 371 (c)(1),
(2), (4) Date: Nov. 24, 2009

(87) PCT Pub. No.: WO2009/110321
PCT Pub. Date: Sep. 11, 2009

(65) Prior Publication Data
US 2010/0171452 A1      Jul. 8, 2010

(30) Foreign Application Priority Data
Mar. 4, 2008   (JP) .................................. 2008-053809

(51) Int. Cl.
*H02P 3/00*      (2006.01)
(52) U.S. Cl. ........................................ 318/375; 318/362
(58) Field of Classification Search .................. 318/375, 318/362, 365, 369, 370, 376
See application file for complete search history.

(56) References Cited

U.S. PATENT DOCUMENTS

| | | | |
|---|---|---|---|
| 6,831,432 B2 | 12/2004 | Murakami | |
| 6,922,032 B2 * | 7/2005 | Maeda | ........................ 318/373 |
| 6,930,458 B2 | 8/2005 | Akiyama et al. | |
| 2003/0102833 A1 | 6/2003 | Murakami | .................... 318/362 |
| 2005/0067890 A1 | 3/2005 | Tagome et al. | |

(Continued)

FOREIGN PATENT DOCUMENTS

CN      1829071 A      9/2006
(Continued)

OTHER PUBLICATIONS

Office Action dated Jan. 17, 2012 from the Japanese Patent Office in Japanese counterpart application.

(Continued)

*Primary Examiner* — Rina Duda
(74) *Attorney, Agent, or Firm* — Morgan, Lewis & Bockius LLP

(57) ABSTRACT

In a motor control circuit which controls energization of a coil on the basis of a detection result of a rotor position, control is performed so that continuous rotation of the rotor by inertia is suppressed, rotation is stopped quickly, and reverse rotation of the rotor is prevented. When an external control signal CTL is changed from L to H, the normal rotation control is switched to reverse rotation control, and a reverse brake state is effected. When motor rotation speed is monitored and reduced to a set rotation speed, a brake control signal SPSB is changed from L to H, and a short brake state is effected. However, the motor continues to be rotated by its own inertia, and a position detection signal HALL is changed. Thus, reverse brake control is temporarily performed (only during a time period corresponding to a pulse width $T_{RB}$). The short pulse reverse brake control is intermittently performed until the motor is completely stopped.

18 Claims, 9 Drawing Sheets

U.S. PATENT DOCUMENTS

| | | | |
|---|---|---|---|
| 2007/0126383 A1* | 6/2007 | Takata et al. | 318/376 |
| 2007/0237530 A1* | 10/2007 | Sunada | 399/21 |
| 2008/0048597 A1* | 2/2008 | Tamaoka | 318/374 |

FOREIGN PATENT DOCUMENTS

| | | |
|---|---|---|
| JP | 2000-209892 A | 7/2000 |
| JP | 2003189651 A | 7/2003 |
| JP | 2003-235287 A | 8/2003 |
| JP | 2005-057993 A | 3/2005 |
| JP | 2006-166666 A | 6/2006 |
| JP | 2007-068400 A | 3/2007 |
| JP | 2008-022678 A | 1/2008 |

OTHER PUBLICATIONS

PCT International Preliminary Report on Patentability and Written Opinion of the International Search Authority dated Oct. 12, 2010.

* cited by examiner

PRIOR ART

MOTOR CONTROL CIRCUIT, MOTOR SYSTEM, AND MOTOR CONTROL METHOD

TECHNICAL FIELD

The present invention relates to a motor control circuit, a motor system, and a motor control method, which control a motor by energizing a motor coil.

BACKGROUND ART

As methods for electrically braking a driven motor, there are a reverse brake control which electrically brakes by applying current to the coil of the motor in the direction opposite to the direction at the time of the normal rotation of the motor, and a short brake control which electrically brakes the motor by a current caused by a counter electromotive voltage that is generated by the rotor magnetic field and the stator coil (by the stator magnetic field and the rotor coil in the case of an inner rotor type motor) at the time when both ends of the motor coil are short-circuited.

FIG. 11 shows changes in rotation speed of a motor at the time when the motor is electrically braked by a conventional control system. The broken line S11 shows a case where only the reverse brake control is performed, and the broken dotted line S12 shows a case where only the short brake control is performed. Further, the two-dot chain line S13 shows a case where the control is performed by the control method disclosed in Japanese Patent Laid-Open No. 2007-68400.

As shown by the broken line S11 in FIG. 11, when the motor which is driven for steady rotation is electrically braked only by the reverse brake from the time T0, the rotation speed is rapidly reduced because the braking force of the reverse brake is large. However, in the reverse brake control, current is applied to the motor coil in the direction opposite to the direction at the time of the normal rotation. Thus, when the current continues to be applied in the reverse direction after the rotor is stopped, and when the current is applied in the reverse direction until the rotor is rotated at low speed immediately before being stopped, the rotor is rotated in the reverse direction. Therefore, in order to prevent the reverse rotation, it is necessary to provide a reverse rotation detection circuit, or to stop the reverse-direction current application at a stage earlier to some extent than the time when the rotor is stopped.

In the case where the rotor is stopped by providing the reverse rotation detection circuit, a time up to the time T3 is required until the rotor is stopped. Further, in the case where the reverse-direction current application is stopped at a stage earlier than when the rotor is continuously, the rotor continues to be rotated by its own inertia, and hence a time longer than the time up to the time T3 is required until the rotor is stopped.

On the other hand, in the case where a motor which is driven for steady rotation is electrically braked only by the short brake, the reverse rotation is not caused as shown by the broken dotted line S12 in FIG. 11. However, since the braking force depends on the back electromotive force, the braking force is also reduced as the rotation speed is reduced, so that a time up to the time T4 is required until the rotor is stopped.

Here, as a conventional control circuit which stops a motor in a short time without requiring the reverse detection circuit, there is described in Japanese Patent Laid-Open No. 2007-68400 a system which performs switching between the reverse brake control and the short brake control according to the rotation speed of the rotor.

In the control system described in Japanese Patent Laid-Open No. 2007-68400, as shown by the two-dot chain line S13 in FIG. 11, the switching between the reverse brake control and the short brake control is performed in dependence upon the rotation speed of the rotor, so as to reduce the rotation speed of the rotor in a short time up to a number of rotation N1 set as a threshold value immediately before the rotor is stopped, and then the short brake control is performed from the time T1 when the rotation speed is reduced lower than the rotation speed N1 set as the threshold value immediately before the rotor is stopped. When such control is performed, it is possible to stop the rotor at the time T2 of shorter time than the time when the rotor is stopped only by one of the reverse brake control and the short brake control.

DISCLOSURE OF THE INVENTION

Problems to be Solved by the Invention

However, there are following problems in the above described control system. That is, the reverse rotation of the rotor is prevented by performing the short brake control at the time when the rotation speed of the rotor is reduced lower than the rotation speed N1 set as the threshold value immediately before the rotor is stopped. However, since the braking force generated by the short brake control at the time of low rotation speed is small, the rotor is continuously rotated by its own inertia, and hence it takes a long time to be stopped.

Here, FIG. 12 shows a timing chart of a position detection signal HALL at the time when the motor is electrically braked. With reference to FIG. 12, it is seen that when the rotor is continuously rotated by its own inertia, the rotation speed of the rotor is low, and hence that the portion of the time period $T_S$, during which the rotor is continuously rotated by its own inertia, may be increased with respect to the time period $T_B$, from the start of braking to the time when the rotor is stopped.

Therefore, in order to shorten the time period until the rotor is stopped, it is important to suppress the continuous rotation of the rotor due to its own inertia.

The present invention has been made in view of the above described circumstance. An object of the present invention is to provide a motor control circuit, a motor system, and a motor control method, which are capable of controlling a motor in such a manner that the rotor is stopped in a short time by suppressing the continuous rotation of the rotor due to its own inertia, and that the reverse rotation of the rotor is prevented.

Means for Solving the Problems

A motor control circuit according to the present invention includes control means which controls energization of a motor coil on the basis of a detection result of a position of a rotor rotated by the energization of the motor coil, and is characterized in that the control means is configured to perform reverse rotation brake control in a first control state, and to effect a short brake state in a second control state subsequent to the first control state and to intermittently perform switching to the reverse brake control.

With such configuration, it is possible to control the motor in such a manner that the rotation of the rotor is stopped in a short time by suppressing the continuous rotation of the rotor due to its own inertia, and that the reverse rotation of the rotor is prevented.

In the case where there is detected a change in a rotor position detection signal corresponding to the continuous rotation of the rotor due to its own inertia in the second control state, the continuous rotation of the rotor due to its own inertia may be suppressed in such a manner that the reverse brake is applied by temporarily performing switching to the reverse brake control. By detecting the change in the rotor position detection signal, the continuous rotation of the rotor due to its own inertia can be suppressed and stopped in a short time.

Further, a period during which the reverse brake control is performed in the second control state may also be able to be arbitrarily set. By suitably setting the period during which the reverse brake control is performed, the continuous rotation of the rotor due to its own inertia can be suppressed and stopped in a short time.

In the second control state, a period during which the reverse brake control is performed may also be set so that the rotation of the rotor is not caused and a maximum torque is generated. When the period during which the reverse brake control is performed is set in this way, the continuous rotation of the rotor due to its own inertia can be suppressed and stopped in a short time.

In the second control state, the reverse brake control may also be performed intermittently and repeatedly until the rotor is completely stopped. By performing the control in this way, the continuous rotation of the rotor due to its own inertia can be suppressed and stopped in a short time.

Further, a timing at which the second control is started may also be able to be arbitrarily set. By suitably setting the timing at which the second control is started, the continuous rotation of the rotor due to its own inertia can be suppressed and stopped in a short time.

The timing may also be set to a timing at which there is a change in the rotor position detection signal corresponding to the continuous rotation of the rotor due to its own inertia. By adopting such timing, the continuous rotation of the rotor due to its own inertia can be suppressed and stopped in a short time.

The rotation speed of the rotor at the time when the application of the reverse brake is ended in the first control state, may also be set to a rotation speed at which the reverse rotation of the rotor is not caused even in the case where the rotor is stopped only in the second control state after the end of the first control state. By setting the rotation speed in this way, the continuous rotation of the rotor due to its own inertia can be suppressed and stopped in a short time.

The control means may include:

a brake control circuit which monitors the rotation speed of the rotor on the basis of the rotor position detection signal obtained by detecting the position of the rotor, and which generates a brake control signal;

a normal rotation control circuit which generates a normal rotation control signal for controlling energization switching to effect the normal rotation of the rotor, on the basis of the rotor position detection signal; and an energization switching control circuit which controls a plurality of transistors for driving the motor coil, in order to perform the motor coil energization based on an external control signal, the brake control signal, and the normal rotation control signal.

By generating the signals to control the plurality of transistors, the switching to the reverse brake control can be intermittently performed in the short brake control state, so that the continuous rotation of the rotor due to its own inertia can be suppressed and stopped in a short time.

The energization switching control circuit may also be configured to perform the switching between the reverse brake control and the short brake control according to the external control signal and the brake control signal. With such configuration, the switching to the reverse brake control can be intermittently performed in the short brake control state, so that the continuous rotation of the rotor due to its own inertia can be suppressed and stopped in a short time.

The brake control circuit may also include:

an edge detection circuit which detects an edge of the rotor position detection signal;

a counter circuit which counts a clock signal and the count value of which is reset by the detection result of the edge detection circuit;

a pulse generation circuit which generates a pulse at the time when the count value becomes equal to a preset reference value; and a generation circuit which generates the brake control signal on the basis of the pulse and the rotor position detection signal.

With such configuration, the continuous rotation of the rotor due to its own inertia can be suppressed and stopped in a short time.

A motor system according to the present invention is characterized by including:

a motor including the rotor and the motor coil;

a magnetic sensor which detects the position of the rotor; and one of the above described motor control circuits.

With such configuration, it is possible to control the motor in such a manner that the continuous rotation of the rotor due to its own inertia can be suppressed and stopped in a short time, and that the reverse rotation of the rotor is prevented.

A motor control method according to the present invention, which controls energization of a motor coil on the basis of a detection result of a position of a rotor rotated by the energization of the motor coil, is characterized by including:

a first control state in which reverse brake control is performed; and a second control state in which a short brake control state is effected subsequently to the first control state, and in which switching to the reverse brake control is intermittently performed.

With such control method, it is possible to control the motor in such a manner that the continuous rotation of the rotor due to its own inertia can be suppressed and stopped in a short time, and that the reverse rotation of the rotor is prevented. By intermittently performing the switching to the reverse brake control, the continuous rotation of the rotor due to its own inertia can be suppressed and stopped in a short time.

When a change in the rotor position detection signal corresponding to the continuous rotation of the rotor due to its own inertia is detected in the second control state, the reverse brake may also be applied by temporarily performing switching to the reverse brake control, so as to suppress the rotation of the rotor due to its own inertia. By detecting the change in the rotor position detection signal, the continuous rotation of the rotor due to its own inertia can be suppressed and stopped in a short time.

A period during which the reverse brake control is performed in the second control state may also be able to be arbitrarily set. By suitably setting the period during which the reverse brake control is performed, the continuous rotation of the rotor due to its own inertia can be suppressed and stopped in a short time.

A period during which the reverse brake control is performed in the second control state may also be set so that the rotation of the rotor is not caused and a maximum torque is generated. When the period during which the reverse brake control is performed is set in this way, the continuous rotation of the rotor due to its own inertia can be suppressed and stopped in a short time.

Further, the reverse brake control may be performed intermittently and repeatedly in the second control state until the rotor is completely stopped. When the reverse brake control is performed in this way, the continuous rotation of the rotor due to its own inertia can be suppressed and stopped in a short time.

Further, the timing at which the second control is started may also be able to be arbitrarily set. By suitably setting the timing at which the second control is started, the continuous rotation of the rotor due to its own inertia can be suppressed and stopped in a short time.

A timing may also be set to a timing at which there is a change in the rotor position detection signal corresponding to the continuous rotation of the rotor due to its own inertia. By adopting such timing, the continuous rotation of the rotor due to its own inertia can be suppressed and stopped in a short time.

The rotation speed of the rotor at the time when the application of reverse brake is ended in the first control state, may also be set to a rotation speed at which the reverse rotation of the rotor is not caused even in the case where the rotor is stopped only in the second control state after the end of the first control state. By setting the rotation speed of the rotor in this way, the continuous rotation of the rotor due to its own inertia can be suppressed and stopped in a short time.

Advantages of the Invention

According to the present invention, the rotation speed of a motor is monitored, and the reverse brake control is performed until the rotation speed of the motor is reduced to a rotation speed immediately before the motor is stopped. Further, after the end of the reverse brake control, the rotation of the motor, which tends to be intermittently rotated by its own inertia, is suppressed by the application of the short pulse reverse brake and the short brake, so that the motor can be stopped in a short time without being rotated in the reverse direction.

DESCRIPTION OF SYMBOLS

Figure 1:
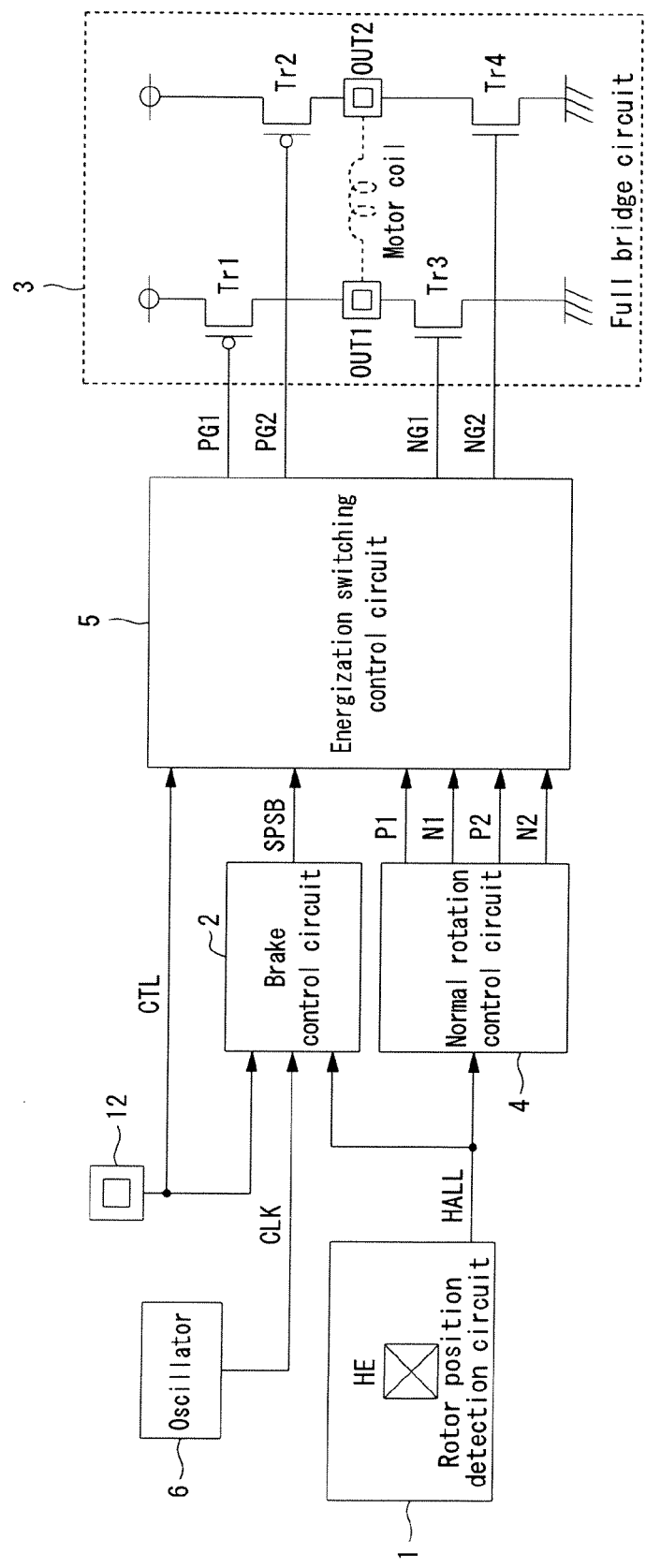
FIG. 1 is a block diagram showing a configuration example of a motor control circuit according to an embodiment of the present invention.

1 Rotor position detection circuit
2 Brake control circuit
3 H type Full bridge circuit
4 Normal rotation control circuit
5 Energization switching control circuit
6 Oscillator
7 Counter circuit
8 Edge detection circuit
9 Pulse generation circuit
10, 11 Dead time generation circuit
12 External terminal
13 D flip-flop circuit
HE Hall element
IN1, IN2 Inverter circuit
OR1 to OR5 OR Gate circuit
OUT1, OUT2 Output terminal
SEL1 to SEL4 Selector
Tr1 to Tr4 Transistor

BEST MODE FOR CARRYING OUT THE INVENTION

In the following, embodiments according to the present invention will be described with reference to the accompanying drawings. Note that in each of the drawings referred to in the following description, identical parts are denoted by the same reference numerals and characters.
(Configuration of Motor Control Circuit)

As shown in FIG. 1, the motor control circuit includes: a rotor position detection circuit 1 which outputs a rotor position detection signal HALL on the basis of a magnetic field detected by a magnetic sensor, for example, a Hall element HE; a brake control circuit 2 which monitors a rotation speed of a motor on the basis of the rotor position detection signal HALL, and which outputs a brake control signal SPSB for controlling the short pulse reverse brake and the short brake; an Full bridge circuit 3 which drives the motor on the basis of the rotor position detection signal HALL; a normal rotation control circuit 4 which outputs a signal for controlling the Full bridge circuit 3 so as to normally rotate the rotor; an energization switching control circuit 5 which controls the Full bridge circuit 3 by selecting one of the normal rotation control, the reverse brake control, and the short brake control; and an oscillator 6 which generates a clock signal CLK which determines operation timings of the whole circuit. Note that a control signal CTL inputted from an external terminal 12 is inputted into the brake control circuit 2 and the energization switching control circuit 5.

The Full bridge circuit 3 includes a bridge circuit formed by MOS transistors Tr1, Tr2, Tr3 and Tr4. Further, a motor coil serving as a load is connected (to a broken line portion in FIG. 1) between an output terminal OUT1 which is a connection point of the MOS transistor Tr1 with the MOS transistor Tr3, and an output terminal OUT2 which is a connection point of the MOS transistor Tr2 with the MOS transistor Tr4.

The normal rotation control circuit 4 outputs signals P1, P2, N1 and N2 for controlling the gates of the MOS transistors Tr1, Tr2, Tr3 and Tr4 configuring the Full bridge circuit 3 so as to normally rotate the rotor.

The energization switching control circuit 5 outputs signals PG1, PG2, NG1 and NG2 for controlling the gates of the MOS transistors Tr1, Tr2, Tr3 and Tr4 configuring the Full bridge circuit 3.

Here, the Full bridge circuit 3 can be configured in such a manner that all the transistors Tr1, Tr2, Tr3 and Tr4 are N-type MOS transistors, or that all the transistors Tr1, Tr2, Tr3 and Tr4 are P-type MOS transistors. Further, it is also possible to use bipolar transistors instead of the MOS transistors.
(Configuration Example of Brake Control Circuit)

Figure 2:
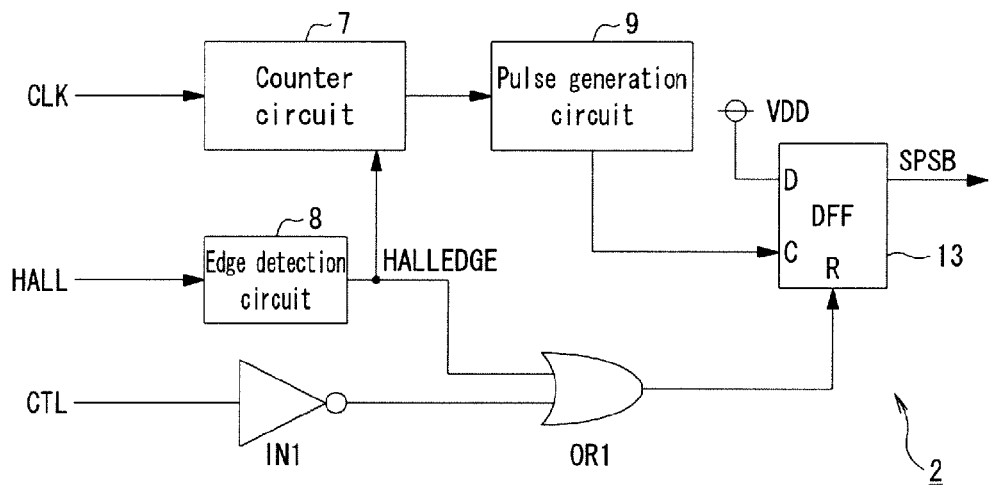
FIG. 2 is a figure showing a configuration example of a brake control circuit in FIG. 1.

FIG. 2 is a figure showing a configuration example of the brake control circuit 2 in FIG. 1. As shown in FIG. 2, the brake control circuit 2 of the example is configured by: a counter circuit 7 which counts up at each rise of the clock signal CLK; an edge detection circuit 8 which generates an edge detection signal HALLEDGE in a pulse form at the time when detecting the edge of the position detection signal HALL; a pulse generation circuit 9 which generates a pulse at the time when the value of the counter becomes equal to a preset value; an inverter circuit IN1 which outputs a signal obtained by inverting the control signal CTL inputted from the external terminal 12; a OR gate circuit OR1 which outputs a OR gate of the edge detection signal HALLEDGE and the signal obtained by inverting the control signal CTL; and a D flip-flop circuit (hereinafter referred to as DFF) 13 having an asynchronous reset terminal R. The D input of the DFF 13 is fixed to the H level, and the output of the DFF 13 is inputted as the brake control signal SPSB into the energization switching control circuit 5 shown in FIG. 1.

The counter circuit 7 performs a count operation based on the clock signal CLK. The count value of the counter circuit 7 is reset at a timing when the edge detection signal HALLEDGE is inputted.

The monitoring of rotation speed is performed in such a manner that a time period $T_H$ from the rise to the fall of the rotor position detection signal HALL is monitored by counting a time period from when the counter circuit 7 is once reset to when the counter circuit is next reset. Further, the switching timing of the brake control signal SPSB for brake control is determined by the time period $T_H$ from the rise to the fall of the position detection signal HALL, and by pulse widths $T_{SB}$ and $T_{RB}$ (as will be described below) corresponding to time periods which are obtained by a value preset in the pulse generation circuit 9 and the period of the clock signal CLK.
(Configuration Example of Normal Rotation Control Circuit)

Figure 3:
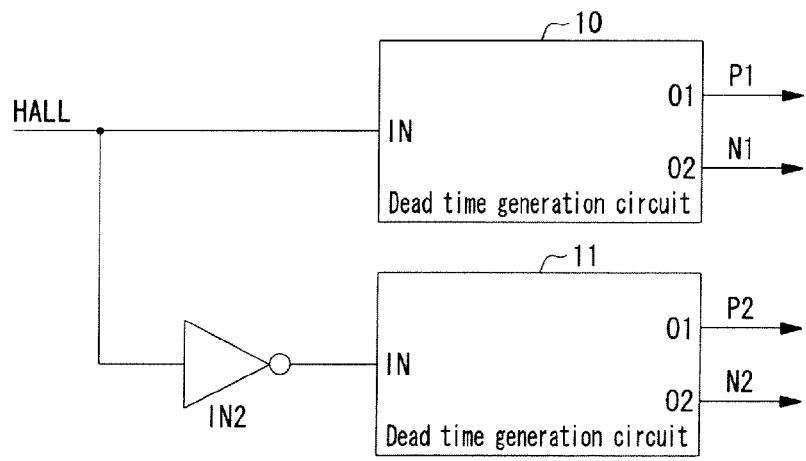
FIG. 3 is a figure showing a configuration example of a normal rotation control circuit in FIG. 1.

FIG. 3 is a figure showing a configuration example of the normal rotation control circuit 4 shown in FIG. 1. As shown in FIG. 3, the normal rotation control circuit 4 of the example is configured by dead time generation circuits 10 and 11, and an inverter circuit IN2 which outputs a signal obtained by inverting the position detection signal HALL, and outputs the signals P1, P2, N1 and N2 for performing control so as to normally rotate the rotor. Note that the dead time means a time period during which all the transistors are set to be turned off in order to prevent the short circuit between the arms, each of which is formed by a set of the transistors.

Figure 4:
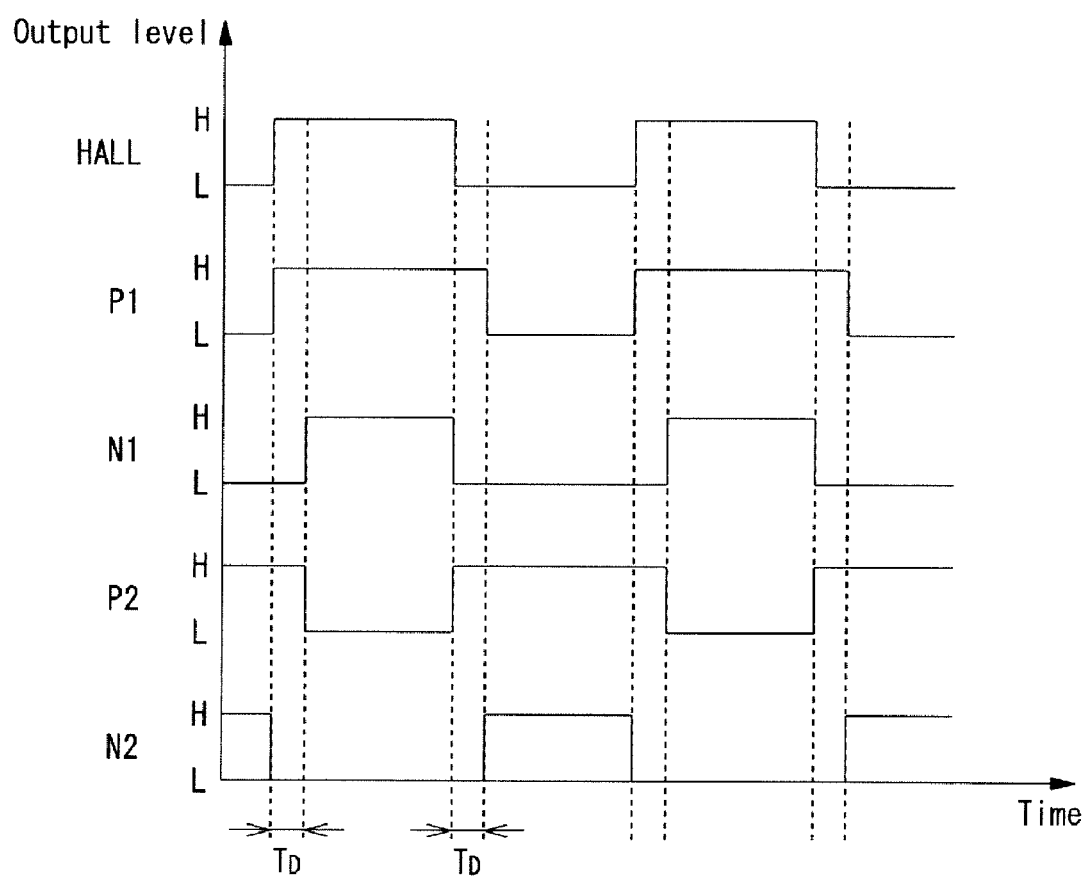
FIG. 4 is a timing chart showing operations of respective sections of the circuit shown in FIG. 3.

Here, FIG. 4 shows a timing chart of signals P1, P2, N1 and N2 for performing control so as to normally rotate the rotor. With reference to FIG. 4, it is seen that with respect to the signals (the HALL signal or the inverted HALL signal) inputted into input terminals IN of the dead time generation circuits 10 and 11 shown in FIG. 3, signals (P1, N1 or P2, N2) provided with a set delay time $T_D$ are outputted from the output terminals O1 and O2 of the dead time generation circuits 10 and 11. Such signals can be outputted from the output terminals O1 and O2 only by taking a logical product and a logical add of a signal obtained by delaying the HALL signal and the original HALL signal. The same applies to the inverted signal of the HALL signal.
(Configuration Example of Energization Switching Control Circuit)

Figure 5:
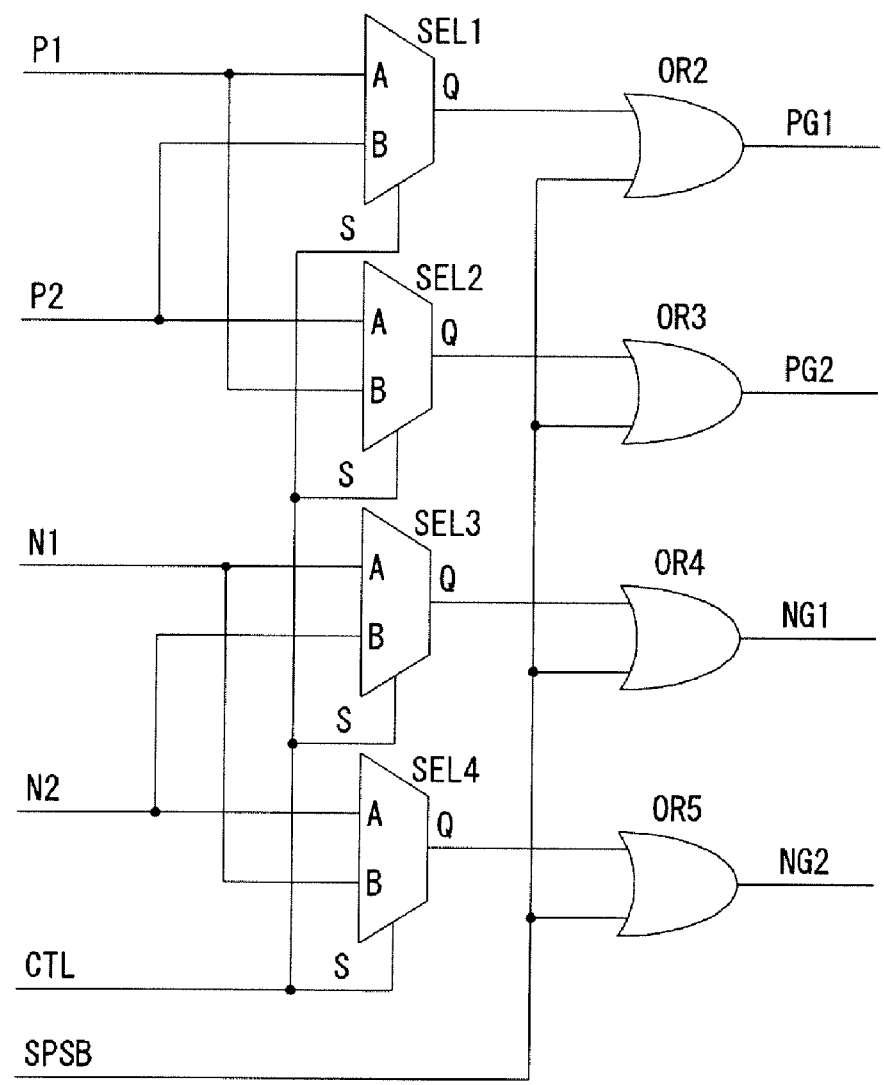
FIG. 5 is a figure showing a configuration example of an energization switching control circuit in FIG. 1.

FIG. 5 is a figure showing a configuration example of the energization switching control circuit 5 shown in FIG. 1. As shown in FIG. 5, the energization switching control circuit 5 of the example is configured by selectors SEL1, SEL2, SEL3 and SEL4 which, when a signal inputted as a selection signal S is set to the L level (low level), outputs an input signal A as an output signal Q, and which, when the signal inputted as the selection signal S is set to the H level (high level), outputs an input signal B as the output signal Q. Also, the energization switching control circuit 5 is configured by OR gate circuits OR2, OR3, OR4 and OR5 which, when the brake control signal SPSB for controlling the short pulse reverse brake and the short brake is set to the H level, outputs a control signal to apply the short brake, and which, when the brake control signal SPSB is set to the L level, outputs a control signal to apply the short pulse reverse brake, and respectively outputs the signals PG1, PG2, NG1 and NG2 for controlling the gates of the MOS transistors Tr1, Tr2, Tr3 and Tr4 (see FIG. 1) configuring the Full bridge circuit 3.
(Example of Operation)

Figure 6:
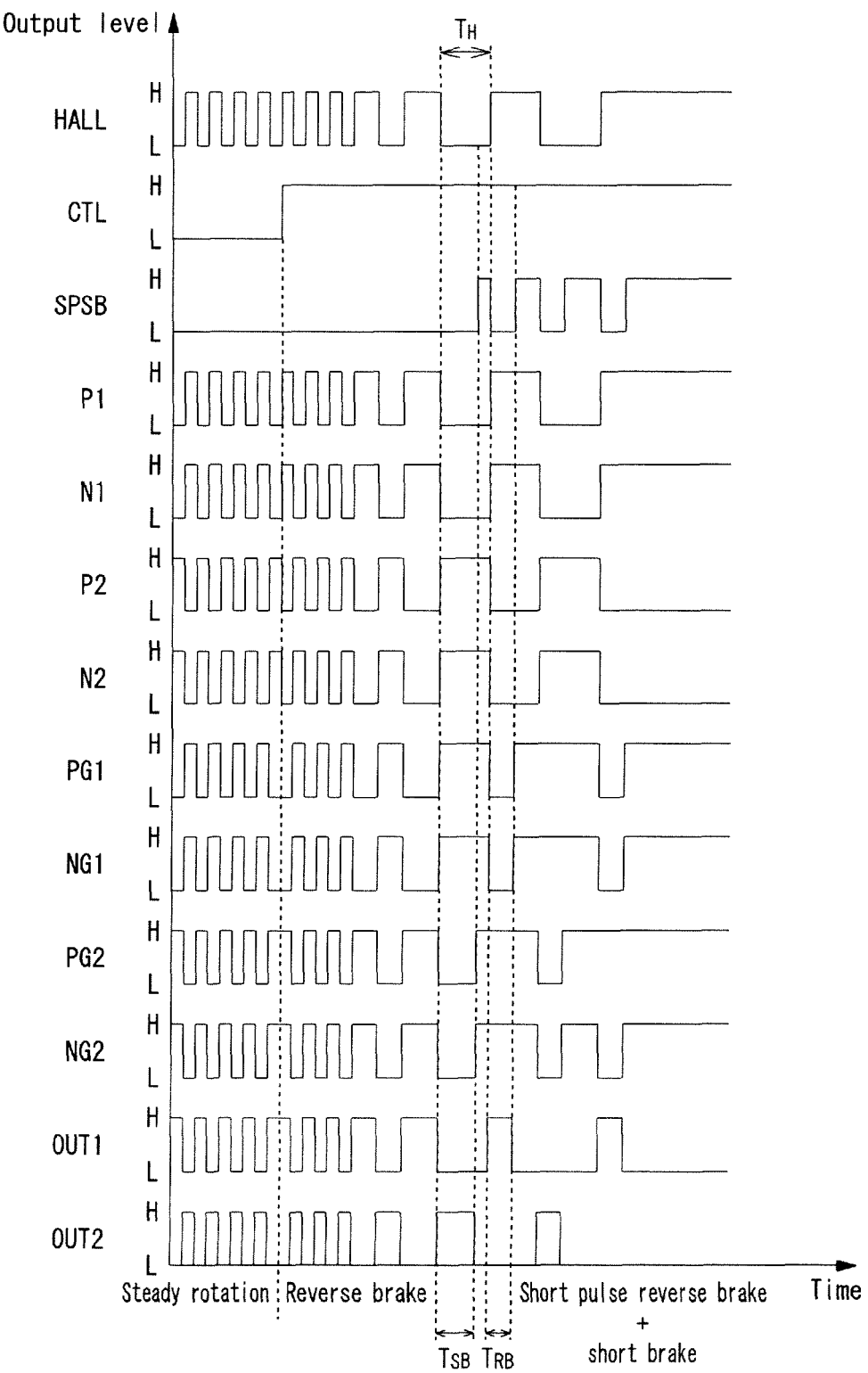
FIG. 6 is a timing chart of main signals at the time when the motor is braked in the embodiment according to the present invention.
Figure 7:
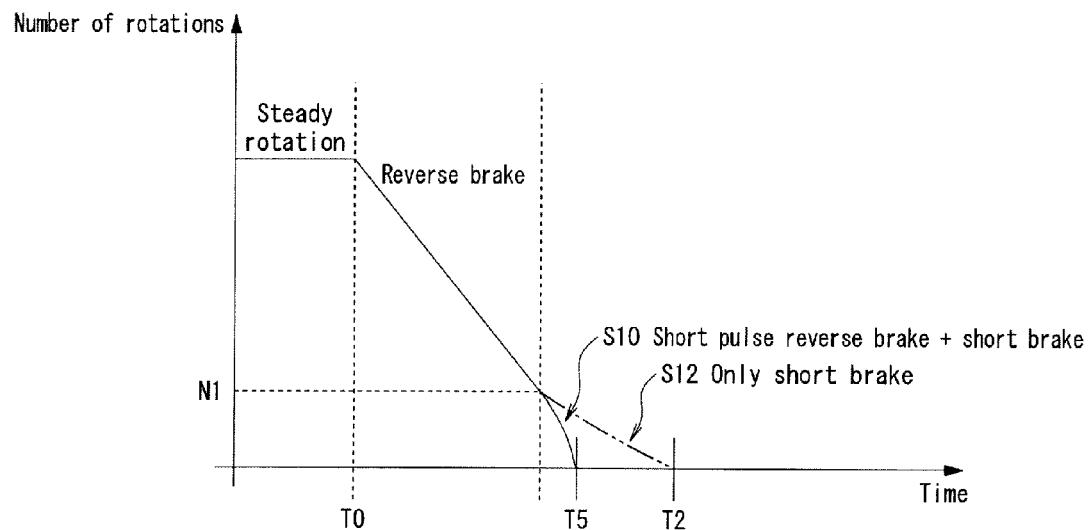
FIG. 7 is a figure showing changes in the rotation speed at the time when the motor is braked in the embodiment according to the present invention.

Next, there will be described signal levels of the respective sections shown in FIG. 1. FIG. 6 is a timing chart of main signals at the time when the motor is braked in the present example. Further, FIG. 7 is a figure showing changes in the rotation speed at the time when the motor is braked in the present example.

In FIG. 6, there are respectively shown changes in output levels of the position detection signal HALL, the control signal CTL, the brake control signal SPSB, the signals P1, N1, P2 and N2 in FIG. 1, the signals PG1, NG1, PG2 and NG2, and output signals from the output terminals OUT1 and OUT2 in FIG. 1.

In the present example, as shown in FIG. 6, when the external control signal CTL is changed from the L level to the H level in a steady rotation state, the content of the output signal Q of the selectors SEL1, SEL2, SEL3 and SEL4 in FIG. 5 is changed from the input signal A to the input signal B. Thereby, the steady rotation control is switched to the reverse brake control, so that the reverse brake state is effected. Along with the switching, the reset of the DFF 13 in FIG. 2 is released, so that the pulse outputted by the pulse generation circuit 9 is made effective.

In the brake control circuit 2 shown in FIG. 1, the rotation speed of the motor is monitored at the time of braking. When the rotation speed of the motor is reduced to a set rotation speed (that is, when $T_H > T_{SB}$), one pulse is outputted by the pulse generation circuit 9 in FIG. 2, so that the brake control signal SPSB which is an output of the DFF 13 is changed from the L level to the H level. Thereby, all the outputs of the OR gate circuits OR2, OR3, OR4 and OR5 in FIG. 5 are set to the H level, so that the short brake state is effected.

However, as shown in FIG. 6, even when the short brake state is effected, the motor continues to be rotated by its own inertia (therefore, the position detection signal HALL is changed). Here, when the position detection signal HALL is changed, the edge detection circuit 8 in FIG. 2 generates a pulse. Thus, when the change in the position detection signal HALL is detected in the short brake state, that is, when the continuous rotation of the motor due to its own inertia is detected, the DFF 13 in FIG. 2 is reset. Thereby, the brake control signal SPSB which is the output of the DFF 13 is changed from the H level to the L level. Therefore, the OR gate circuits OR2, OR3, OR4 and OR5 in FIG. 5 output the reverse brake control signal.

At this time the counter circuit 7 in FIG. 2 is also reset, and hence the counter circuit 7 starts counting from when the brake control signal SPSB is changed to the L level. When a time corresponding to a pulse width $T_{RB}$ set in the pulse generation circuit 9 elapses, the pulse generation circuit 9 again generates a pulse. By the pulse outputted by the pulse generation circuit 9, the brake control signal SPSB which is the output of the DFF 13 is again set to the H level, so as to return to the short brake control state. Therefore, the reverse brake control is temporarily performed only during the time period corresponding to the pulse width $T_{RB}$ (Hereinafter referred to as short pulse reverse brake control). Note that as shown in FIG. 6, the short pulse reverse brake control is performed intermittently and repeatedly until the motor is completely stopped.

Therefore, the continuous rotation of the motor due to its own inertia is suppressed by the short pulse reverse brake control and the short brake control. For this reason, as shown in FIG. 7, in the above described operation (corresponding to the solid line S10 in FIG. 7), it is possible to reduce the stopping time period to the time period up to the time T5, as compared with the stopping time period up to the time T2 in the conventional case where the motor is stopped only by the short brake control (corresponding to the two-dot chain line S13 in FIG. 7)*after* the rotation speed of the motor is reduced to a rotation speed immediately before the motor is stopped.
(Reverse Brake End Timing)

Here, in the above described brake control, the rotation speed N1 (set by the time period $T_{SB}$), at which the application of the reverse brake is ended, is set to a rotation speed at which the reverse rotation of the motor is not caused even when the motor is stopped only by the application of the short brake after the application of the reverse brake is ended.

Figure 8:
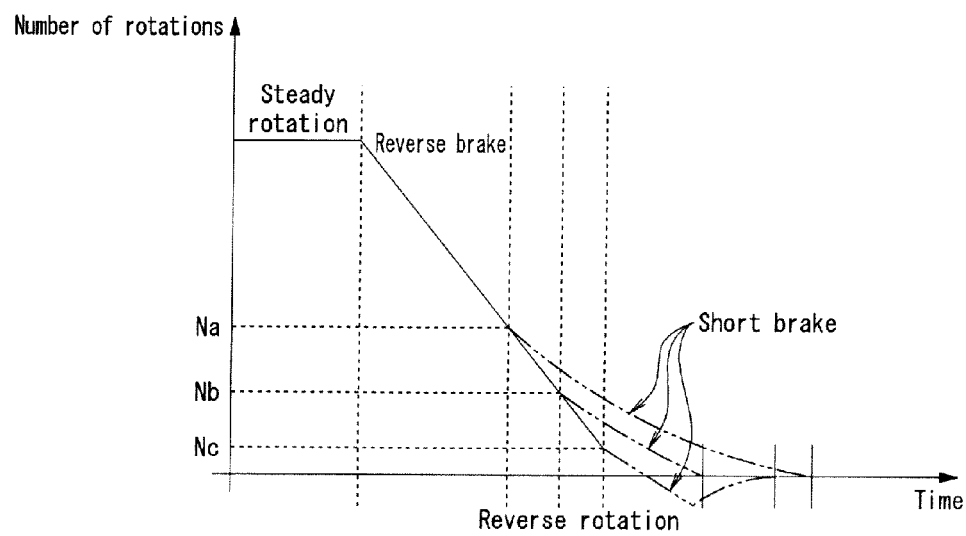
FIG. 8 is a figure showing changes in the rotation speed at different brake control timings in the embodiment according to the present invention.

FIG. 8 is a figure showing examples of changes in the rotation speed in the cases where the rotation speed at which the application of the reverse brake is ended is set to Na, Nb and Nc, respectively. In FIG. 8, the section to which the short brake is applied is represented by the two-dot chain line. With reference to FIG. 8, it is seen that when the rotation speed at which the application of the reverse brake is ended is set to Na, the section of applying the short brake is too long, and thereby it takes a time until the motor is stopped. Further, it is seen that when the rotation speed at which the application of the reverse brake is ended is set to Nc, the torque generated by the reverse brake in the reverse rotation direction is too large, and hence the motor is rotated in the reverse direction. Therefore, the rotation speed Nb, at which the motor is not rotated in the reverse direction and is stopped in the shortest time, is adopted as an optimum setting rotation speed.

Figure 9:
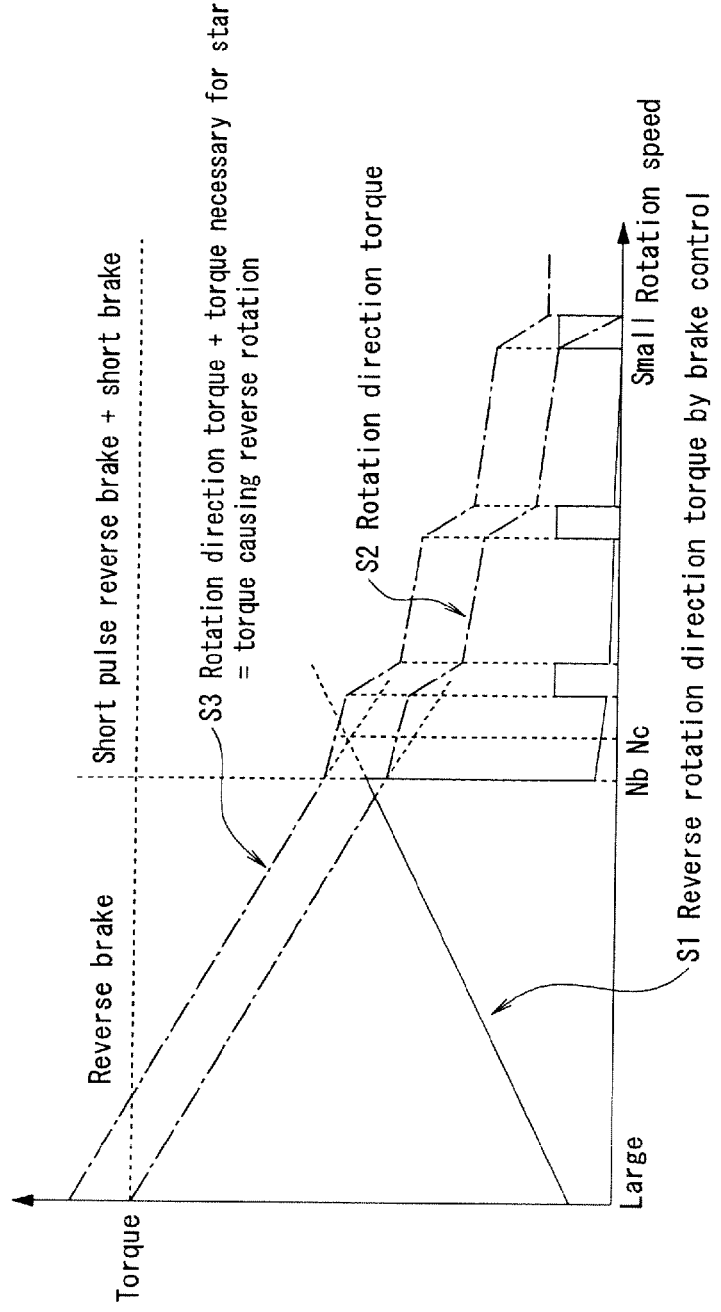
FIG. 9 is a figure for explaining the reason why the reverse rotation of the rotor is not caused in the embodiment according to the present invention.

Here, with reference to FIG. 9, there is described the reason why the reverse rotation is not caused in the method according to the present invention in spite of the fact that the rotation speed, at which the application of the reverse brake is ended, is the same as the rotation speed in the case of the conventional control method, and that the torque in the reverse rotation direction is further applied by the application of the short pulse reverse brake in the method according to the present invention. In FIG. 9, the solid line S1 shows the torque which is applied to the rotor in the reverse rotation direction by the brake control, and the broken dotted line S2 shows the rotor torque in the normal rotation direction. Further, the two-dot chain line S3 shows the amount of torque obtained by adding the normal rotation direction rotor torque shown by the broken dotted line S2, to the torque which is required to make the rotor start rotating from the stop state. When a torque which exceeds the two-dot chain line S3 even momentarily is added to the rotor, the reverse rotation of the rotor is caused.

With reference to FIG. 9, it is seen that the reverse rotation direction torque applied by the brake control shown by the solid line S1 is increased as the rotation speed is reduced. Thus, the rotor torque in the normal rotation direction which is shown by the broken dotted lines S2, and the torque which is shown by the two-dot chain line S3 and which causes the reverse direction rotation are reduced as the rotation speed of the rotor is reduced.

In the case where the rotation speed at which the application of the reverse brake is ended is set to Nc as shown in FIG. 8, the reverse rotation of the rotor is caused by the change in the rotation speed, because the reverse brake is applied up to the rotation speed at which the reverse rotation direction torque applied by the brake control shown by the solid line S1 exceeds the torque which is shown by the two-dot chain line S3 and which causes the reverse rotation. In the case where the set rotation speed at which the application of the reverse brake is ended is set to Nb, the reverse rotation of the rotor is not caused, because when the rotation speed Nb is reached, the reverse rotation direction torque applied by the brake shown by the solid line S1 does not exceed the torque which is shown by the two-dot chain line S3 and which causes the reverse rotation. Further, even when the short pulse reverse brake is applied as shown in FIG. 9, the reverse rotation of the rotor is not caused as long as the reverse rotation direction torque caused by the application of the short pulse reverse brake does not exceed the torque which is shown by the two-dot chain line S3 and which causes the reverse rotation. Therefore, the pulse width TRB (see FIG. 6) of the short pulse reverse brake is set to such a pulse width that the motor is not rotated even when the energization is performed during the pulse width period in the stop state of the motor.
(Pulse Width of Short Pulse Reverse Brake)

Figure 10:
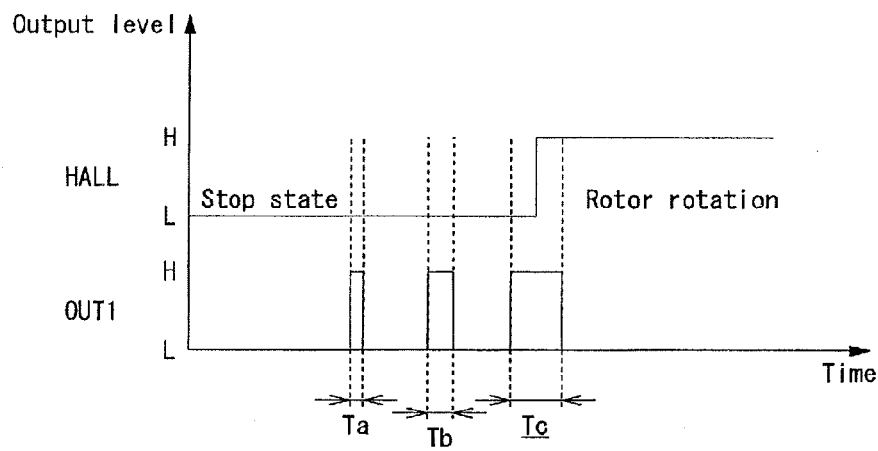
FIG. 10 is a figure showing position detection signal outputs corresponding to different application pulse widths in the embodiment according to the present invention.
Figure 11:
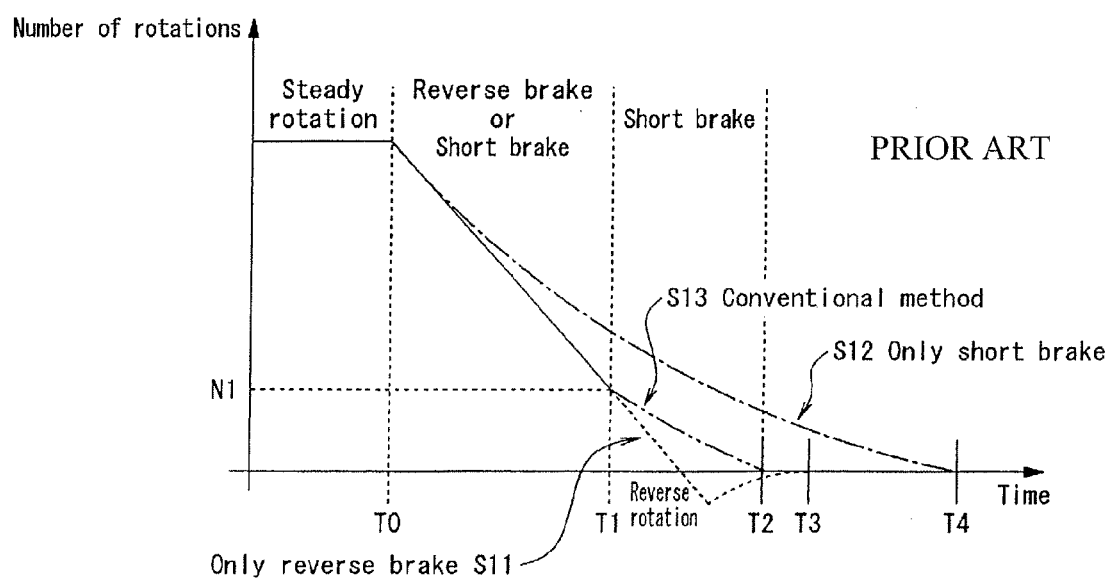
FIG. 11 is a figure showing changes in the rotation speed at the time when the motor is braked by a conventional method.
Figure 12:
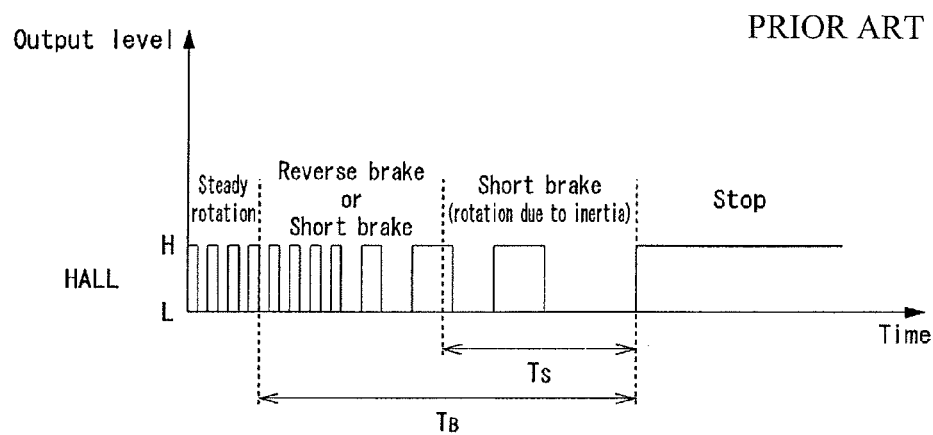
FIG. 12 is a timing chart showing the rotor position detection signal in the conventional method.

The setting of the pulse width of the short pulse reverse brake is described with reference to FIG. 10. FIG. 10 shows outputs of the position detection signal HALL at the time when voltages of respective pulse widths are applied in the stop state of the motor.

With reference to FIG. 10, it is seen that when pulses having pulse widths of Ta and Tb are applied, the position detection signal HALL is not changed, and hence that the rotor is not rotated. However, it is seen that when a voltage having a pulse width Tc is applied, the position detection signal HALL is changed, and hence that the rotor is rotated. Therefore, an optimum pulse width of the short pulse reverse brake is the pulse width Tb in which the rotation of the rotor is not caused and in which a maximum torque is generated.

This method of determining the pulse width of the short pulse reverse brake is a method in the case where the pulse width of the short pulse reverse brake is always constant. It is also possible to change the pulse width of the short pulse reverse brake according to the rotation speed. In this case, the pulse width of the short pulse reverse brake at each rotation speed is set so that the torque of the short pulse brake does not exceed the torque which is shown by the two-dot chain line S3 in FIG. 9 and which causes the reverse rotation.
(Example of Variation)

In the above described control method, the pulse width $T_{SB}$ which determines the rotation speed at the end of the application of the reverse brake, and the pulse width $T_{RB}$ of the short pulse reverse brake are set beforehand in the pulse generation circuit 9 in FIG. 2. However, the pulse widths can also be set from the outside by providing an input of a plurality of bits in the pulse generation circuit 9.

Further, the oscillator 6 shown in FIG. 1, which generates the clock signal CLK for determining the operation timings, may also be configured such that the period of the clock signal CLK is not fixed and can be adjusted from the outside. For example, the period of the clock signal CLK can be adjusted from the outside by adopting a configuration in which the period of the clock signal CLK is determined by externally connected components, such as resistors or capacitors.

(Conclusion)

As described above, the rotation speed at which the reverse brake control is switched to the short pulse reverse brake control and the short brake control, and the pulse width of the short pulse reverse brake control are set to optimum values. Thereby, it is possible to realize that a motor is stopped in a short time without being rotated in the reverse direction. Further, it is also possible that in order to reduce vibration noise at the time of braking, the short brake control is first started without the reverse brake being performed at the start of the braking, and that the switching between the short pulse reverse brake control and the short brake control is then performed. It is also possible that the short pulse reverse brake control and the short brake control are performed from the start of the brake.

In the above described brake control, there is described the full torque operation in which the PWM (Pulse Width Modulation) control is not performed during the application of the reverse brake and the short pulse reverse brake. However, it is also possible to perform the PWM control during the application of the reverse brake and the short pulse reverse brake. When the PWM control is performed at the time of the brake control so as to change the duty and the frequency of the PWM control pulse, it is possible to easily adjust the stopping time, the vibration noise level, and the power consumption.

Further, the above described control method can be applied not only to a motor having a single phase coil but also to a motor having multi-phase coils.

INDUSTRIAL APPLICABILITY

The present invention can be utilized in control of a motor.

The invention claimed is:

1. A motor control circuit including control means which controls energization of a motor coil on the basis of a detection result of a position of a rotor rotated by the energization of the motor coil,
wherein the control means is configured:
to perform reverse rotation brake control in a first control state; and
to effect a short brake control state in a second control state subsequent to the first control state and to intermittently perform switching to the reverse brake control,
wherein in the second control state, the reverse brake control is performed intermittently and repeatedly until the rotor is completely stopped.

2. The motor control circuit according to claim 1, wherein when a change in the rotor position detection signal corresponding to continuous rotation of the rotor due to its own inertia is detected in the second control state, the reverse brake is applied by temporarily performing switching to the reverse brake control, to thereby suppress the continuous rotation of the rotor due to its own inertia.

3. The motor control circuit according to claim 1 or 2, wherein a period during which the reverse brake control is performed in the second control state can be arbitrarily set.

4. The motor control circuit according to claim 3, wherein a period during which the reverse brake control is performed in the second control state is set so that the rotation of the rotor is not caused and a maximum torque is generated.

5. The motor control circuit according to claim 1, wherein a timing at which the second control is started can be arbitrarily set.

6. The motor control circuit according to claim 5, wherein the timing is a timing at which the rotor position detection signal corresponding to continuous rotation of the rotor due to its own inertia is changed.

7. The motor control circuit according to claim 1, wherein the rotor rotation speed at the time when the application of the reverse brake is ended in the first control state is set to a rotation speed at which even when the rotor is stopped only in the second control state after the end of the first control state, the reverse rotation of the rotor is not caused.

8. The motor control circuit according to claim 1, wherein the control means comprises:
a brake control circuit which monitors the rotor rotation speed on the basis of the rotor position detection signal obtained by detecting the position of the rotor, and which generates a brake control signal;
a normal rotation control circuit which generates a normal rotation control signal for control of energization switching to effect the normal rotation of the rotor, on the basis of the rotor position detection signal; and
an energization switching control circuit which controls a plurality of transistors for driving the motor coil, in order to perform the motor coil energization based on an external control signal, the brake control signal, and the normal rotation control signal.

9. The motor control circuit according to claim 8, wherein the energization switching control circuit performs switching between the reverse brake control and the short brake control according to the external control signal and the brake control signal.

10. The motor control circuit according to one of claim 8 or 9, wherein the brake control circuit comprises:
an edge detection circuit which detects an edge of the rotor position detection signal;
a counter circuit which counts a clock signal and the count value of which is reset on the basis of the detection result from the edge detection circuit;
a pulse generation circuit which generates a pulse at the time when the count value becomes equal to a preset reference value; and
a generation circuit which generates the brake control signal on the basis of the pulse and the rotor position detection signal.

11. A motor system comprising:
a motor including the rotor and the motor coil;
a magnetic sensor which detects the position of the rotor; and
the motor control circuit according to claim 1.

12. A motor control method for controlling energization of a motor coil on the basis of a detection result of a position of a rotor rotated by the energization of the motor coil, the motor control method comprising:
a first control state in which reverse brake control is performed; and
a second control state in which a short brake control state is effected subsequently to the first control state, and in which switching to the reverse brake control is intermittently performed, wherein in the second control state, the reverse brake control is performed intermittently and repeatedly until the rotor is completely stopped.

13. The motor control method according to claim 12, wherein when a change in the rotor position detection signal corresponding to continuous rotation of the rotor due to its own inertia is detected in the second control state, the reverse brake may also be applied by temporarily performing switching to the reverse brake control, so as to suppress the continuous rotation of the rotor due to its own inertia.

14. The motor control method according to claim 12 or 13, wherein a period during which the reverse brake control is performed in the second control state can be arbitrarily set.

15. The motor control method according to claim 14, wherein a period during which the reverse brake control is performed in the second control state is set so that the rotation of the rotor is not caused and a maximum torque is generated.

16. The motor control method according to claim 12, wherein a timing at which the second control is started can be arbitrarily set.

17. The motor control method according to claim 16, wherein the timing is a timing at which the rotor position detection signal corresponding to continuous rotation of the rotor due to its own inertia is changed.

18. The motor control method according to claim 12, wherein the rotor rotation speed at the time when the application of the reverse brake is ended in the first control state is set to a rotation speed at which even when the rotation of the rotor is stopped only in the second control state after the end of the first control state, the reverse rotation of the rotor is not caused.

* * * * *